US011256722B2

(12) United States Patent
Kilroy et al.

(10) Patent No.: US 11,256,722 B2
(45) Date of Patent: Feb. 22, 2022

(54) TECHNIQUES FOR MODELING AGGREGATION RECORDS

(71) Applicant: Oath Inc., New York, NY (US)

(72) Inventors: Jonathan David Kilroy, Mahomet, IL (US); Dale Arthur Nussel, Mahomet, IL (US); Allie Khalil Watfa, Champaign, IL (US); Mangesh Madan Pardeshi, Champaign, IL (US)

(73) Assignee: VERIZON MEDIA INC., New York, NY (US)

( * ) Notice: Subject to any disclaimer, the term of this patent is extended or adjusted under 35 U.S.C. 154(b) by 187 days.

(21) Appl. No.: 16/504,661

(22) Filed: Jul. 8, 2019

(65) Prior Publication Data

US 2019/0332611 A1 Oct. 31, 2019

Related U.S. Application Data

(63) Continuation of application No. 14/661,979, filed on Mar. 18, 2015, now Pat. No. 10,346,433.

(51) Int. Cl.
*G06F 16/28* (2019.01)
*G06F 16/25* (2019.01)
*G06F 16/2455* (2019.01)

(52) U.S. Cl.
CPC ...... *G06F 16/283* (2019.01); *G06F 16/24552* (2019.01); *G06F 16/254* (2019.01)

(58) Field of Classification Search
CPC . G06F 16/283; G06F 16/24552; G06F 16/254
USPC .......................................................... 707/602
See application file for complete search history.

(56) References Cited

U.S. PATENT DOCUMENTS

| | | | |
|---|---|---|---|
| 8,185,534 B1 * | 5/2012 | Singhal | G06F 16/25 707/741 |
| 2013/0110614 A1 * | 5/2013 | Wagner | G06Q 30/02 705/14.41 |
| 2013/0346234 A1 * | 12/2013 | Hendrick | G06Q 30/02 705/26.7 |
| 2014/0101093 A1 * | 4/2014 | Lanphear | G06F 16/254 707/602 |
| 2015/0363465 A1 * | 12/2015 | Bordawekar | G06F 16/24532 707/718 |

* cited by examiner

*Primary Examiner* — Alicia M Antoine
(74) *Attorney, Agent, or Firm* — Cooper Legal Group, LLC

(57) ABSTRACT

Techniques and technologies described herein can generate and provide identifiers, such as unique identifiers, for individual records of aggregate data. Such identifiers allow systems to cache and reuse individual records of aggregate data. Also, such identifiers can facilitate simpler analytic views of aggregate data.

20 Claims, 6 Drawing Sheets

TECHNIQUES FOR MODELING AGGREGATION RECORDS

CROSS REFERENCE TO RELATED APPLICATION

This application claims priority to and is a continuation of U.S. application Ser. No. 14/661,979, filed on Mar. 18, 2015, entitled "TECHNIQUES FOR MODELING AGGREGATION RECORDS", which is incorporated herein.

BACKGROUND

This application relates to techniques for modeling aggregation records, such as aggregation records associated with online analytical processing (OLAP).

There are many common ways for web services to model entities associated with online interactions and ecommerce. For example, there are many ways for web services to model a webpage, a blog post, an online audience member, an ad impression, and an invoice. Usually it is convenient to assign unique identifiers to entities, such as by assigning ID numbers incrementally. Systems can then use the unique identifiers to retrieve data from a database, memory, and/or an application programming interface (API), for example.

In the case of aggregate data, assigning unique identifiers can be difficult and using such identifiers may not be readily available. Often, data sources of aggregate data provide data without uniquely identifiable records. For example, online analytical processing (OLAP) data sources often do not use unique identifiers for their records. For instance, in a plurality of records of a collection of facts from an OLAP data source, each record may not include a unique identifier such as a serial number. Also, for instance, in a fact table of OLAP data, each row of facts in the table may not be unique or may not include a serial number or some other form of unique indicator for a row. In such systems, it can be difficult to retrieve individual records. Also, creating an entity map and caching and reusing such records can be complex. These technical problems can also make record sharing amongst various types of requesters (such as Javascript or PHP objects) problematic. This is especially the case when such sharing relies on cached records.

There is, therefore, a set of engineering problems that can be solved in generating and providing unique identifiers for records of aggregate data. Also, there is a set of technical problems to be solved in creating techniques to generate and provide unique identifiers for records of aggregate data. Resolution of such engineering problems is pertinent considering the vast benefits of using aggregate data (such as aggregate data from OLAP sources).

Additionally, aggregate data is especially useful for analytics in the competitive landscape of online advertising. The resolution of at least the aforementioned technical issues can benefit advertisers in providing more effective and efficient use of ad impressions and targeted advertising. For instance, such solutions may result in a greater number of user interactions with online ads. Also, these technical solutions can benefit online ad network providers in servicing advertisers and content providers providing ad spots for the ads. The novel technologies described herein also set out to solve a set of technical problems caused by the scope in analyzing data from online advertising sources. Today, there is room for improvement for resolving the aforementioned problems in uniquely identifying records of aggregate data and then using such records, efficiently and effectively, to improve analytical tasks. This is especially the case in online advertising.

BRIEF DESCRIPTION OF THE DRAWINGS

The systems and methods may be better understood with reference to the following drawings and description. Non-limiting and non-exhaustive examples are described with reference to the following drawings. The components in the drawings are not necessarily to scale; emphasis instead is being placed upon illustrating the principles of the system. In the drawings, like referenced numerals designate corresponding parts throughout the different views.

DETAILED DESCRIPTION

Subject matter will now be described more fully hereinafter with reference to the accompanying drawings, which form a part hereof, and which show, by way of illustration, specific examples. Subject matter may, however, be embodied in a variety of different forms and, therefore, covered or claimed subject matter is intended to be construed as not being limited to examples set forth herein; examples are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Aspects of systems and operations, described herein, labeled as "first", and "second", and so on, should not necessarily be interpreted to have chronological associations with each other. In other words, such labels are used to merely distinguish aspects of the systems and operations described herein, unless the context of their use implies or expresses chronological associations.

Overview

Before describing the subject matter more fully with reference to the drawings, this section provides an overview of examples of the techniques for modeling aggregation records and uses of such modeling.

The techniques and technologies described herein can generate and provide identifiers, such as unique identifiers, for individual records of aggregate data. Such identifiers allow systems to cache and reuse individual records of aggregate data. Also, such identifiers can facilitate simpler analytic views of aggregate data.

The techniques and technologies can generate and provide the identifiers for records of aggregate data by identifying a plurality of records within a collection of facts (such as a set of records of a fact table associated with OLAP) and a plurality of dimensions of a related multidimensional data structure (such as a set of dimensions of a OLAP cube). Respective values for each dimension of the plurality of dimensions can also be identified, such as per record of the plurality of records. These techniques and technologies can also include concatenating values for each dimension on a per record basis, which can result in a composite key for each record. A resulting composite key can be used as an identifier (such as a unique identifier) for a record of the aggregate data. Also, a composite key can be used as an identifier in caching and reuse of a record from an aggregate data source. For example, a composite key can be a unique identifier of a record from an OLAP data source and that key can be used in the caching of the record.

DESCRIPTION OF THE DRAWINGS

Figure 1:
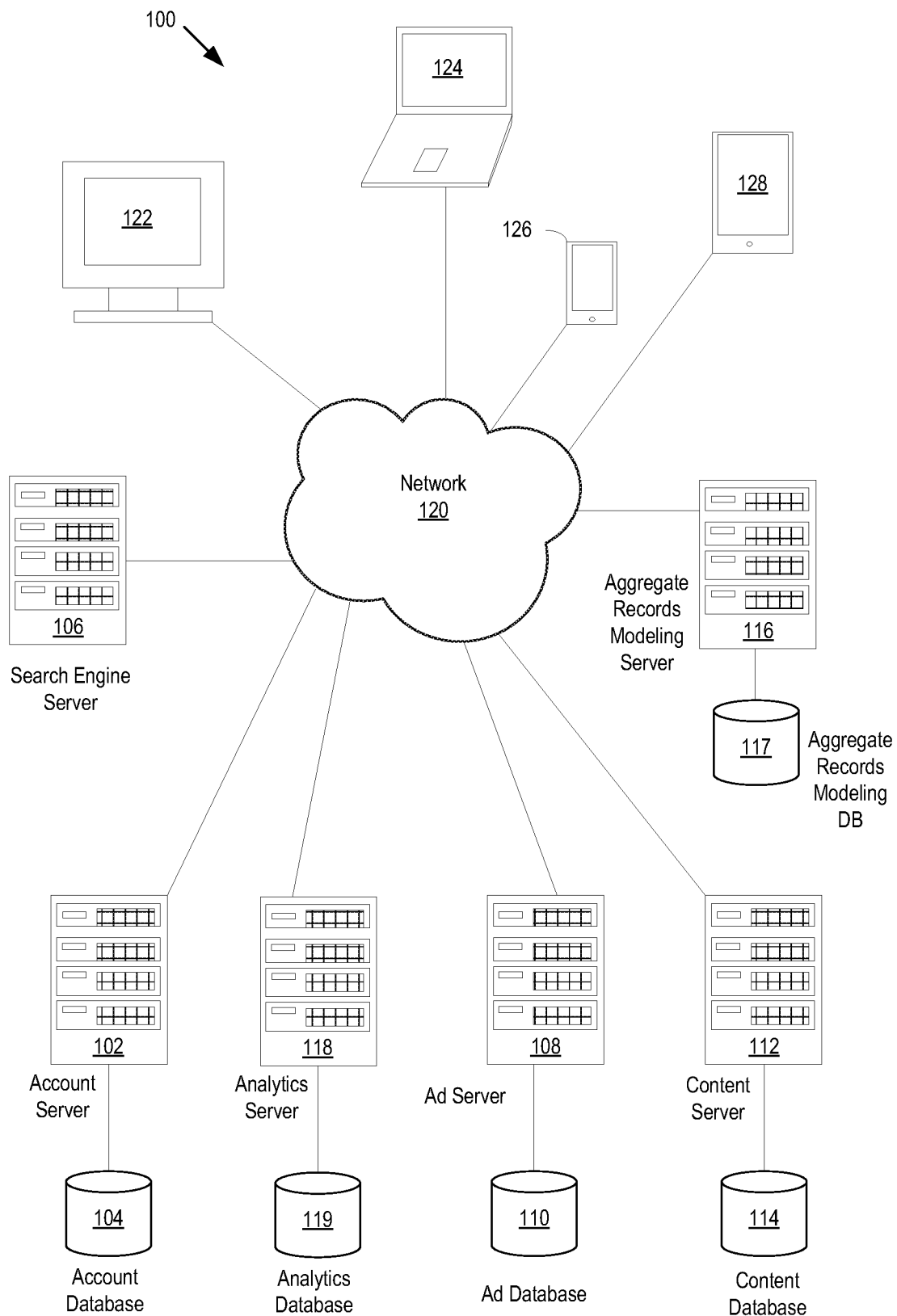
FIG. 1 illustrates a block diagram of an example information system 100 that includes example devices of a network that can communicatively couple with an example system that can provide aggregate records modeling.

FIG. 1 illustrates a block diagram of an example information system 100 that includes example devices of a network that can communicatively couple with an example system that can provide aggregate records modeling. The information system 100 in the example of FIG. 1 includes an account server 102, an account database 104, a search engine server 106, an ad server 108, an ad database 110, a content database 114, a content server 112, an aggregate records modeling 116, an aggregate records modeling database 117, an analytics server 118, and an analytics database 119. The aforementioned servers and databases can be communicatively coupled over a network 120. The network 120 may be a computer network. The aforementioned servers may each be one or more server computers.

The information system 100 may be accessible over the network 120 by administrator devices and audience devices, which may be desktop computers (such as device 122), laptop computers (such as device 124), smartphones (such as device 126), and tablet computers (such as device 128). An audience device can be a user device that presents online content to a user, such as a device that presents online advertisements to an audience member. In various examples of such an online information system, users may search for and obtain content from sources over the network 120, such as obtaining content from the search engine server 106, the ad server 108, the ad database 110, the content server 112, and the content database 114. Advertisers may provide advertisements for placement on online properties, such as web pages, and other communications sent over the network to audience devices. The online information system can be deployed and operated by an online services provider, such as Yahoo! Inc.

The account server 102 stores account information for advertisers. The account server 102 is in data communication with the account database 104. Account information may include database records associated with each respective advertiser. Suitable information may be stored, maintained, updated and read from the account database 104 by the account server 102. Examples include advertiser identification information, advertiser security information, such as passwords and other security credentials, account balance information, and information related to content associated with their ads, and user interactions associated with their ads and associated content. The account information may include ad booking information, and such booking information may be communicated to the aggregate records modeling server 116 for processing and the aggregate records modeling database 117 for storage before and after processing. This information as well as any information used in the information system 100 may be processed by the aggregate records modeling server 116 and/or the analytics server 118, so that such information is organized into a plurality of records of a collection of facts and a plurality of dimensions of a multidimensional data structure. The collection of facts can be organized in a fact table associated with online analytics processing (OLAP). The multidimensional data structure can be an OLAP cube. Also, the plurality of records of the collection of facts and the plurality of dimensions of the multidimensional data structure can be organized, normalized, and stored in the aggregate records modeling database 117 and/or the analytics database 119. Normalization of such information in these databases can enhance speed of information retrieval and other operations performed by the aggregate records modeling server 116 and the analytics server 118.

The account server 102, like other servers described herein, may be implemented as a single server, a plurality of servers, or another type of computing device known in the art that provides similar functionality. Access to the account server 102, like other servers described herein, can be accomplished through a firewall. The firewall protects applications and data, such as account management programs and the account information, from external tampering. Besides a firewall, additional security may be provided via enhancements to the standard communications protocols, such as Secure HTTP (HTTPS) or the Secure Sockets Layer (SSL). Such security may be applied to any of the servers of FIG. 1, for example.

The account server 102 may provide an advertiser frontend to simplify the process of accessing the account information of an advertiser. The advertiser frontend may be a program, application, or software routine that forms a user interface. In a particular example, the advertiser frontend is accessible as a website with electronic properties that an accessing advertiser may view on an administrator device, such as one of the devices 122-128 when logged on by an advertiser. The advertiser may view and edit account data and advertisement data, such as ad booking data, using the advertiser frontend. After editing the advertising data, the account data may then be saved to the account database 104.

The search engine server 106 may be accessed by audience devices over the network 120. An audience client device may communicate a user query to the search engine server 106. For example, a query entered into a query entry box can be communicated to the search engine server 106. The search engine server 106 locates matching information using a suitable protocol or algorithm and returns information to the audience client device, such as in the form of ads or content. The search engine server 106 may be designed to help users and potential audience members find information located on the Internet or an intranet. In an example, the search engine server 106 may also provide to the audience client device over the network 120 an electronic property, such as a web page, with content, including search results, information matching the context of a user inquiry, links to other network destinations, or information and files of information of interest to a user operating the audience client device, as well as a stream or web page of content items and advertisement items selected for display to the user. This information provided by the search engine server 106 may be logged, and such logs may be communicated to the aggregate records modeling server 116 and/or the analytics server 118 for processing and analysis. Besides this information, any data outputted by processes of the servers of FIG. 1 may also be logged, and such logs can be communicated to the aggregate records modeling server 116 and/or the analytics server 118 for processing and analysis. For example, the data logs and/or the analytics outputted by the analytics server 118 can be input for the various operations and aspects of the circuitries of the aggregate records modeling server 116, such as any of the circuitries of the aggregate records modeling server 116 illustrated in FIG. 3. For example, such logs may be transformed into the plurality of records of the collection of facts and the plurality of dimensions of the multidimensional data structure. In an example, these logs can be organized into tables that can support OLAP. For instance, the collection of facts can be organized in a fact table and the multidimensional data structure can be organized into an OLAP cube by an OLAP processor.

The search engine server 106 may enable a device, such as an advertiser client device or an audience client device, to search for files of interest using a search query. Typically, the search engine server 106 may be accessed by a client device (such as the devices 122-128) via servers or directly over the network 120. The search engine server 106 may include a crawler component, an indexer component, an index storage component, a search component, a ranking component, a cache, a profile storage component, a logon component, a profile builder, and application program interfaces (APIs). The search engine server 106 may be deployed in a distributed manner, such as via a set of distributed servers, for example. Components of distributed computers for this server and any other servers described herein may be duplicated within a network for redundancy or quicker access to data.

The ad server 108 operates to serve advertisements to audience devices. An advertisement may include text data, graphic data, image data, video data, or audio data. Advertisements may also include data defining advertisement information that may be of interest to a user of an audience device. The advertisements may also include respective audience targeting information and/or ad campaign information. An advertisement may further include data defining links to other online properties reachable through the network 120. The aforementioned targeting information and the other data associated with advertising may be logged in data logs. These logs, similar to other data logs described herein, can also be communicated to the aggregate records modeling server 116 and/or the analytics server 118 for processing and analysis. The data logs and/or the analytics outputted by these servers can be input for the various operations and aspects of the circuitries of the aggregate records modeling server 116, such as any of the circuitries of the aggregate records modeling server 116 illustrated in FIG. 3.

For online service providers, advertisements may be displayed on electronic properties resulting from a user-defined search based, at least in part, upon search terms. Also, advertising may be beneficial and/or relevant to various audiences, which may be grouped by demographic and/or psychographic. A variety of techniques have been developed to determine audience groups and to subsequently target relevant advertising to members of such groups. Group data and individual user's interests and intentions along with targeting data related to campaigns may be may be logged in data logs. One approach to presenting targeted advertisements includes employing demographic characteristics (such as age, income, sex, occupation, etc.) for predicting user behavior, such as by group. Advertisements may be presented to users in a targeted audience based, at least in part, upon predicted user behavior. Another approach includes profile-type ad targeting. In this approach, user profiles specific to a user may be generated to model user behavior, for example, by tracking a user's path through a website or network of sites, and compiling a profile based, at least in part, on pages or advertisements ultimately delivered. A correlation may be identified, such as for user purchases, for example. An identified correlation may be used to target potential purchasers by targeting content or advertisements to particular users. Similarly, the aforementioned profile-type targeting data may be logged in data logs. Yet another approach includes targeting based on content of an electronic property requested by a user. Advertisements may be placed on an electronic property or in association with other content that is related to the subject of the advertisements. The relationship between the content and the advertisement may be determined in a suitable manner. The overall theme of a particular electronic property may be ascertained, for example, by analyzing the content presented therein. Moreover, techniques have been developed for displaying advertisements geared to the particular section of the article currently being viewed by the user. Accordingly, an advertisement may be selected by matching keywords, and/or phrases within the advertisement and the electronic property. The aforementioned targeting data may be logged in data logs.

The ad server 108 includes logic and data operative to format the advertisement data for communication to an audience member device, which may be any of the devices 122-128. The ad server 108 is in data communication with the ad database 110. The ad database 110 stores information, including data defining advertisements, to be served to user devices. This advertisement data may be stored in the ad database 110 by another data processing device or by an advertiser. The advertising data may include data defining advertisement creatives and bid amounts for respective advertisements and/or audience segments. The aforementioned ad formatting and pricing data may be logged in data logs. The advertising data may be formatted to an advertising item that may be included in a stream of content items and advertising items provided to an audience device. The formatted advertising items can be specified by appearance, size, shape, text formatting, graphics formatting and included information, which may be standardized to provide a consistent look for advertising items in the stream. The aforementioned advertising data may be logged in data logs.

Further, the ad server 108 is in data communication with the network 120. The ad server 108 communicates ad data and other information to devices over the network 120. This information may include advertisement data communicated to an audience device. This information may also include advertisement data and other information communicated with an administrator device. An advertiser operating an administrator device may access the ad server 108 over the network to access information, including advertisement data. This access may include developing advertisement creatives, editing advertisement data, deleting advertisement data, setting and adjusting bid amounts and other activities. The ad server 108 then provides the ad items to other network devices, such as the aggregate records modeling server 116, the analytics server 118, and/or the account server 102. Ad items, ad information, such as pricing, and any other information associated with the online advertising can be logged in data logs.

The ad server 108 may provide an advertiser frontend to simplify the process of accessing the advertising data of an advertiser. The advertiser frontend may be a program, application or software routine that forms a user interface. In one particular example, the advertiser frontend is accessible as a website with electronic properties that an accessing advertiser may view on the administrator device. The advertiser may view and edit advertising data using the advertiser frontend. After editing the advertising data, the advertising data may then be saved to the ad database 110 for subsequent communication in advertisements to an audience device. In viewing and editing the advertising data, adjustments can be logged in data logs.

Additionally, the advertiser frontend and/or an ad network administrator frontend may provide a graphical user interface for viewing and interacting with information provided by the aggregate records modeling server 116 and the analytics server 118. These frontends, as well as any other frontends described herein and selected to provide such a feature, may provide any of the information described herein to permitted users (such as to permitted administrators or developers). Such information may be part of the records of the collection of facts, and retrieval of the information may be through the composite keys described herein. For example, at operation 514 of FIG. 5, circuitry can direct displaying of a retrieved record of the collection of facts within a GUI on a display device, such as within a GUI of a frontend described herein and selected to provide such a feature.

The content server 112 may access information about content items either from the content database 114 or from another location accessible over the network 120. The content server 112 communicates data defining content items and other information to devices over the network 120. The information about content items may also include content data and other information communicated by a content provider operating a content provider device. A content provider operating a content provider device may access the content server 112 over the network 120 to access information. This access may be for developing content items, editing content items, deleting content items, setting and adjusting bid amounts and other activities, such as associating content items with certain types of ad campaigns. A content provider operating a content provider device may also access the aggregate records modeling server 116 over the network 120 to access analytics data and records of the collection of facts if permitted. Such analytics and records may help focus developing content items, editing content items, deleting content items, setting and adjusting bid amounts, and activities related to distribution of the content. Advertisers may also take advantage of such information in bidding on content for impressions and any other activities related to development and distribution of online ads. Also, such information may be logged as data logs.

The content server 112 may provide a content provider frontend to simplify the process of accessing the content data of a content provider. The content provider frontend may be a program, application or software routine that forms a user interface. In a particular example, the content provider frontend is accessible as a website with electronic properties that an accessing content provider may view on the content provider device. The content provider may view and edit content data using the content provider frontend. After editing the content data, such as at the content server 112 or another source of content, the content data may then be saved to the content database 114 for subsequent communication to other devices in the network 120. Information related to the content data and interactions with such data may be logged in data logs.

The content provider frontend, such as any other frontend described herein may be a client-side application and/or corresponding computer hardware. A script and/or applet and the script and/or applet may manage the retrieval of campaign data. A script and/or applet associated with other frontends may also manage other types of retrievable data described herein. In an example, a frontend, such as the content provider frontend, may include a graphical display of fields for selecting various types of information such as information pertaining to an advertising campaign. Such frontends, via a script and/or applet, can request information, such as a record from the collection of facts from the aggregate records modeling server 116. The requested information can then be displayed, such as displayed according to the script and/or applet. Scripts and/or applets can also provide data logging of some of the data described herein, such as data related to user interactions with client-side applications including interactions with online content and ad impressions.

The content server 112 includes logic and data operative to format content data for communication to the audience device. The content server 112 can provide content items or links to such items to the analytics server 118 or the aggregate records modeling server 116 to associate with aggregate records modelling. For example, content items and links may be matched to user interaction data, such as through temporal information. All of which may be logged in data logs. Also, the content data may be formatted to a content item that may be included in a stream of content items and advertisement items provided to an audience device. The formatted content items can be specified by appearance, size, shape, text formatting, graphics formatting and included information, which may be standardized to provide a consistent look for content items in the stream. The formatting of content data and other information and data outputted by the content server may be logged in data logs. For example, content items may have an associated bid amount that may be used for ranking or positioning the content items in a stream of items presented to an audience device. In other examples, the content items do not include a bid amount, or the bid amount is not used for ranking the content items. Such content items may be considered non-revenue generating items. The bid amounts and other related information may be logged in data logs.

The aforementioned servers and databases may be implemented through a computing device. A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include a central processing unit and memory. A server may also include a mass storage device, a power supply, wired and wireless network interfaces, input/output interfaces, and/or an operating system, such as Windows Server, Mac OS X, UNIX, Linux, FreeBSD, or the like.

The aforementioned servers and databases may be implemented as online server systems or may be in communication with online server systems. An online server system may include a device that includes a configuration to provide data via a network to another device including in response to received requests for page views or other forms of content delivery. An online server system may, for example, host a site, such as a social networking site, examples of which may include, without limitation, Flicker, Twitter, Facebook, LinkedIn, or a personal user site (such as a blog, vlog, online dating site, etc.). An online server system may also host a variety of other sites, including, but not limited to business sites, educational sites, dictionary sites, encyclopedia sites, wikis, financial sites, government sites, etc. An online server system may further provide a variety of services that may include web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as an online server system include desktop computers, multiprocessor systems, microprocessor-type or programmable consumer electronics, etc. The online server system may or may not be under common ownership or control with the servers and databases described herein. Information communicated to and from such servers may be logged in data logs.

The network 120 may include a data communication network or a combination of networks. A network may couple devices so that communications may be exchanged, such as between a server and a client device or other types of devices, including between wireless devices coupled via a wireless network, for example. A network may also include mass storage, such as a network attached storage (NAS), a storage area network (SAN), or other forms of computer or machine readable media, for example. A network may include the Internet, local area networks (LANs), wide area networks (WANs), wire-line type connections, wireless type connections, or any combination thereof. Likewise, sub-networks, such as may employ differing architectures or may be compliant or compatible with differing protocols, may interoperate within a larger network, such as the network 120. Various types of devices may be made available to provide an interoperable capability for differing architectures or protocols. For example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links, including satellite links, or other communication links or channels, such as may be known to those skilled in the art. Furthermore, a computing device or other related electronic devices may be remotely coupled to a network, such as via a telephone line or link, for example. Any information related to these networking technologies may be logged in data logs.

An advertiser, content provider, administrator, or audience client device, similar to any client device described herein, may be any one of the devices 122-128, and may include a data processing device that may access the information system 100 over the network 120. A client device is operative to interact over the network 120 with any of the servers or databases described herein. A client device may implement a client-side application for viewing electronic properties and submitting user requests. A client device may communicate data to the information system 100, including data defining electronic properties and other information. A client device may receive communications from the information system 100, including data defining electronic properties and advertising creatives. Also, a fat client device may provide much of the functionality a server can provide. The aforementioned interactions and information of client devices may be logged in data logs. A client device may implement a client-side application for viewing electronic content. A user operating a client device may enter a search request and communicate the search request to the information system 100. The search request is processed by the search engine and search results are returned to the client device. The aforementioned interactions and information may be logged as well.

In other examples, a user of a client device may request data, such as a page of information from the online information system 100. The data instead may be provided in another environment, such as a native mobile application, TV application, or an audio application. The online information system 100 may provide the data or re-direct the browser to another source of the data. In addition, the ad server may select advertisements from the ad database 110 and include data defining the advertisements in the provided data to the client device. The aforementioned interactions and information may be logged in data logs.

Also, a client device, such as any of the devices 122-128, may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include a physical or virtual keyboard, mass storage, an accelerometer, a gyroscope, global positioning system (GPS) or other location-identifying type capability, or a display with a high degree of functionality, such as a touch-sensitive color 2D or 3D display, for example. A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating messages, such as via email, short message service (SMS), or multimedia message service (MMS), including via a network, such as a social network, including, for example, Facebook, LinkedIn, Twitter, Flickr, or Google+, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally or remotely stored or streamed video, or games. The foregoing is provided to illustrate that claimed subject matter is intended to include a wide range of possible features or capabilities. At least some of the features, capabilities, and interactions with the aforementioned may be logged in data logs.

Also, the disclosed methods and systems may be implemented at least partially in a cloud-computing environment, at least partially in a server, at least partially in a client device, or in a combination thereof, and particularities associated with these implementations may be logged in data logs. Thus, these logs similar to the other data logs described herein can also be communicated to the aggregate records modeling server 116 and/or the analytics server 118 for processing and analysis. The data logs and/or the analytics outputted by these servers can then be input for the various operations and aspects of the circuitries of the aggregate records modeling server 116, such as any of the circuitries of the aggregate records modeling server 116 illustrated in FIG. 3.

Figure 2:
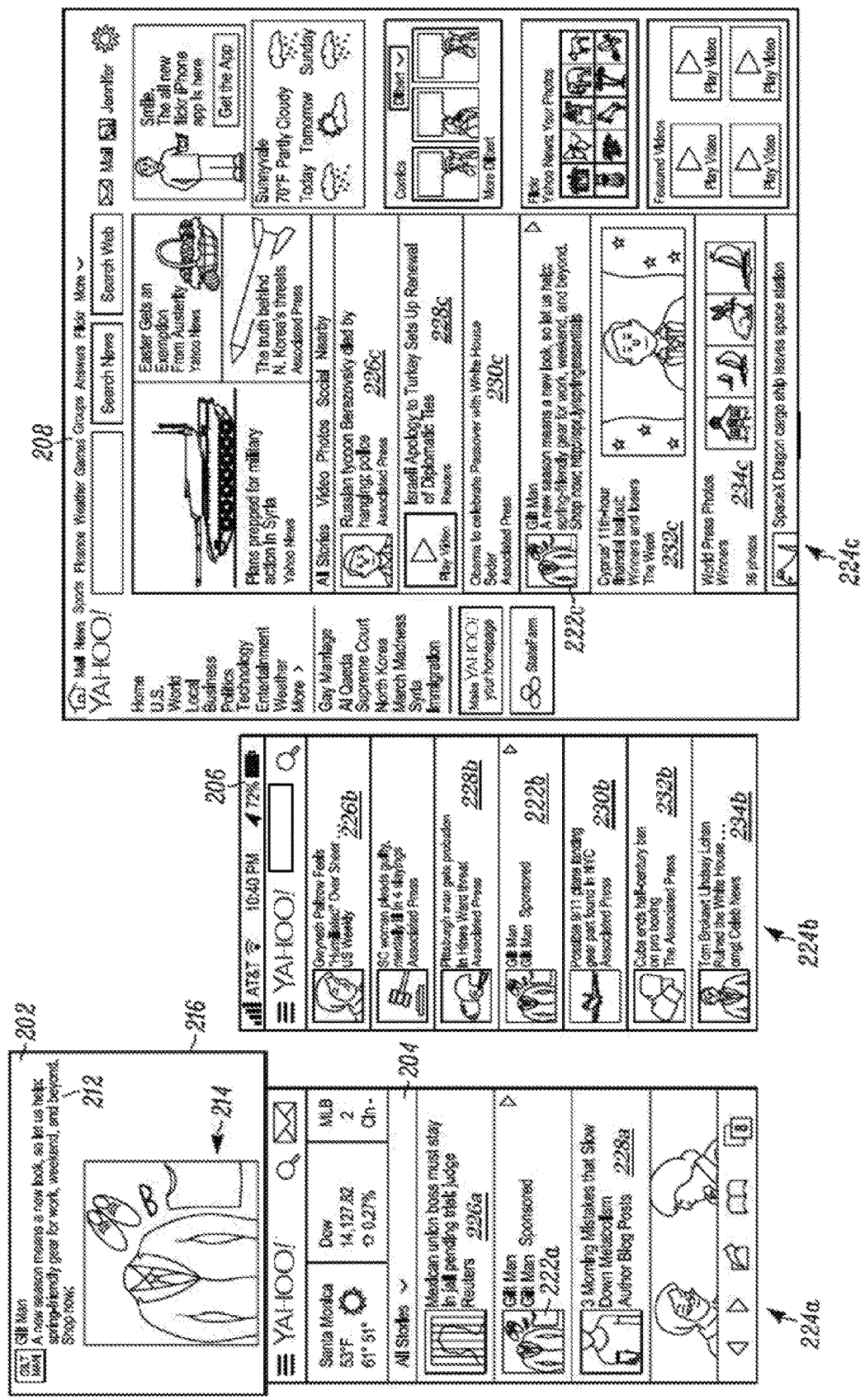
FIG. 2 illustrates displayed ad items and content items of example screens rendered by client-side applications. Some of the displayed items may be provided through advertising channels that log data for use in aggregate records modeling.

FIG. 2 illustrates displayed ad items and content items of example screens rendered by client-side applications. The content items and ad items displayed may be provided by the search engine server 106, the ad server 108, or the content server 112. User interactions with the ad items and content items can be tracked and logged in data logs. Also, session data including indications of the user interactions with the items (such as session data 301a) may be directly communicated to the interface circuitry 320 and then identified and logged as data logs.

In FIG. 2, a display ad 202 is illustrated as displayed on a variety of displays including a mobile web device display 204, a mobile application display 206 and a personal computer display 208. The mobile web device display 204 may be shown on the display screen of a smart phone, such as the device 126. The mobile application display 206 may be shown on the display screen of a tablet computer, such as the device 128. The personal computer display 208 may be displayed on the display screen of a personal computer (PC), such as the desktop computer 122 or the laptop computer 124.

The display ad 202 is shown in FIG. 2 formatted for display on an audience device but not as part of a stream to illustrate an example of the contents of such a display ad. The display ad 202 includes text 212, graphic images 214 and a defined boundary 216. The display ad 202 can be developed by an advertiser for placement on an electronic property, such as a web page, sent to an audience device operated by a user. The display ad 202 may be placed in a wide variety of locations on the electronic property. The defined boundary 216 and the shape of the display ad can be matched to a space available on an electronic property. If the space available has the wrong shape or size, the display ad 202 may not be useable. Such reformatting may be logged in data logs.

In these examples, the display ad is shown as a part of streams 224a, 224b, and 224c. The streams 224a, 224b, and 224c include a sequence of items displayed, one item after another, for example, down an electronic property viewed on the mobile web device display 204, the mobile application display 206 and the personal computer display 208. The streams 224a, 224b, and 224c may include various types of items. In the illustrated example, the streams 224a, 224b, and 224c include content items and advertising items. For example, stream 224a includes content items 226a and 228a along with advertising item 222a; stream 224b includes content items 226b, 228b, 230b, 232b, 234b and advertising item 222b; and stream 224c includes content items 226c, 228c, 230c, 232c and 234c and advertising item 222c. With respect to FIG. 2, the content items can be items published by non-advertisers. However, these content items may include advertising components. Each of the streams 224a, 224b, and 224c may include a number of content items and advertising items.

In an example, the streams 224a, 224b, and 224c may be arranged to appear to the user to be an endless sequence of items, so that as a user, of an audience device on which one of the streams 224a, 224b, or 224c is displayed, scrolls the display, a seemingly endless sequence of items appears in the displayed stream. The scrolling can occur via the scroll bars, for example, or by other known manipulations, such as a user dragging his or her finger downward or upward over a touch screen displaying the streams 224a, 224b, or 224c. To enhance the apparent endless sequence of items so that the items display quicker from manipulations by the user, the items can be cached by a local cache and/or a remote cache associated with the client-side application or the page view.

The content items positioned in any of streams 224a, 224b, and 224c may include news items, business-related items, sports-related items, etc. Further, in addition to textual or graphical content, the content items of a stream may include other data as well, such as audio and video data or applications. Each content item may include text, graphics, other data, and a link to additional information. Clicking or otherwise selecting the link re-directs the browser on the client device to an electronic property referred to as a landing page that contains the additional information. The clicking or otherwise selecting of the link, the re-direction to the landing page, the landing page, and the additional information, for example, can each be tracked, and then the data associated with the tracking can be logged in data logs. Like this data, any type resulting information related to the features described with respect to FIG. 2 may be logged in data logs.

Stream ads like the advertising items 222a, 222b, and 222c may be inserted into the stream of content, supplementing the sequence of related items, providing a more seamless experience for end users. Similar to content items, the advertising items may include textual or graphical content as well as other data, such as audio and video data or applications. Each advertising item 222a, 222b, and 222c may include text, graphics, other data, and a link to additional information. Clicking or otherwise selecting the link re-directs the browser on the client device to an electronic property referred to as a landing page. The clicking or otherwise selecting of the link, the re-direction to the landing page, the landing page, and the additional information, for example, can each be tracked, and then the data associated with the tracking can be logged in data logs. While the example streams 224a, 224b, and 224c are shown with a single visible advertising item 222a, 222b, and 222c, respectively, a number of advertising items may be included in a stream of items. Also, the advertising items may be slotted within the content, such as slotted the same for all users or slotted based on personalization or grouping, such as grouping by audience members or content. Adjustments of the slotting may be according to various dimensions and algorithms. Also, slotting may be according to campaign control. The slotting and any other operation associated with campaign control described herein may occur via controller interface circuitry that provides interfacing between a controller and other types of circuits, such as a circuit of any of the servers illustrated in FIG. 1. The controller interface circuitry and the controller may be hosted on the aggregate records modeling server 116. All of this can be logged and similar to the other data logs described herein can also be communicated to the aggregate records modeling server 116 and/or the analytics server 118 for processing and analysis. Then output of such data processing and analysis can be input for the various operations and aspects of the circuitries of the aggregate records modeling server 116, such as any of the circuitries of the aggregate records modeling server 116 illustrated in FIG. 3.

Figure 3:
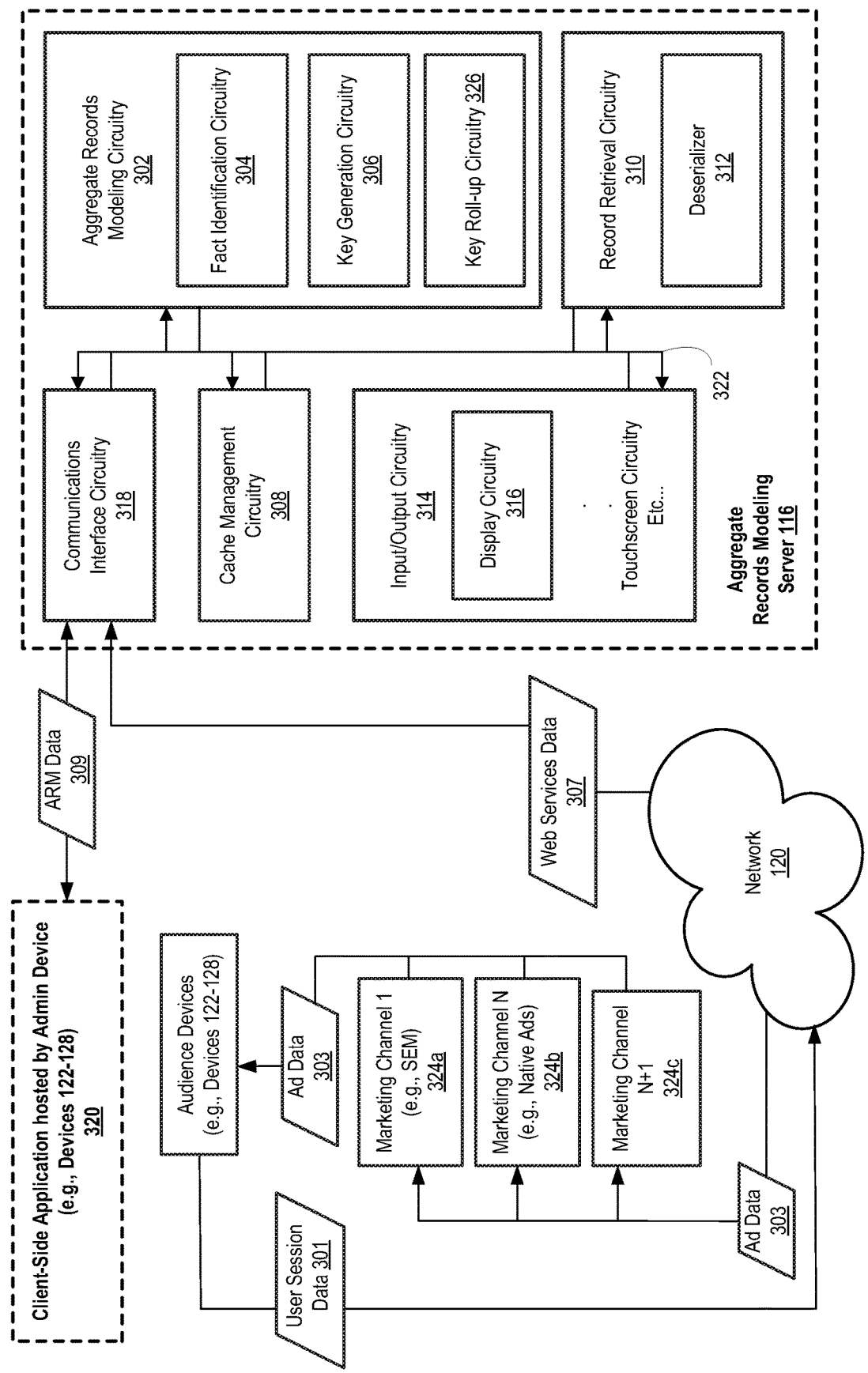
FIG. 3 illustrates a block diagram of example aspects of a system that can provide provide aggregate records modeling, such as the system in FIG. 1.

FIG. 3 illustrates a block diagram of example aspects of a system, such as the system in FIG. 1, which can provide aggregate records modeling. Each of the circuitries described with respect to FIG. 3 may be hosted by one or more servers and client devices, such as one or more of the servers and client devices illustrated in FIG. 1. Also, many of the circuitries may be embedded in the aggregate records modeling server 116. Additionally or alternatively, many of the circuitries may be embedded as client-side applications in a client device, such as (such as the devices 122-128).

The circuitries in FIG. 3 include aggregate records modeling circuitry 302, fact identification circuitry 304, key generation circuitry 306, cache management circuitry 308, record retrieval circuitry 310, a deserializer 312, input/output circuitry 314, display circuitry 316, communications interface circuitry 318, client-side application circuitry 320, and marketing channel circuitries 324a-324c. Each of the circuitries can be communicatively coupled with each other and may be a part of or communicatively coupled to a processor (such as the processor 602 illustrated in FIG. 6). For example, the circuitries 302-318 may be communicatively coupled via a bus 322. Also, these circuitries and the bus may be part of the aggregate records modeling server 116. These circuitries may also be communicatively coupled with other circuitries and/or themselves over a network, such as network 120 illustrated in FIG. 1. For example, circuitries of the aggregate records modeling server 116 may be communicatively coupled to the client-side application circuitry 320 and the marketing channel circuitries 324a-324c over the network 120. The client-side application circuitry 320 may be a part of any one of the client devices 122-128 illustrated in FIG. 1. The marketing channel circuitries 324a-324c each may be part of any one or more of the servers illustrated in FIG. 1. Additionally or alternatively, the circuitries 302-318 may be part of any one or more of the servers illustrated in FIG. 1.

FIG. 3 illustrates the aggregate records modeling server 116 receiving web services data 307 via its communications interface circuitry 318. In an example, the web services data 307 may be communicated from a web services aspect of the analytics server 118 illustrated in FIG. 1. Further, analytics, raw and processed user interaction data, ad targeting and/or retargeting data, ad profile data, or any combination thereof may be communicated back to the analytics server 118 in the form of feedback data.

Feedback data, ad profile data, online property data (such as webpage profile data), and user session data may be stored in the analytics database 119, such as in an architecture and/or format that is retrievable through OLAP and/or data retrieval web services. This data may be stored as separate parts as a collection of facts and a multidimensional data structure. This data, which can also be included in the web services data 307, can be received by the communications interface circuitry 318 of the aggregate records modeling server 116. The data may also be stored in the aggregate records modeling database 117.

Data processed by one or more of the circuitries of the aggregate records modeling server 116 (such as aggregate record modeling data 309 or abbreviated as ARM data 309) can be communicated to administrative client devices (which may be any one or more of the devices 122-128 illustrated in FIG. 1). This communicated information can then be viewed by administrative users of an ad network service. In some examples, alternatively, one or more of the circuitries of the aggregate records modeling server 116 can be included in an administrative client device. In such examples, one or more client-side applications, such as the client side application 320, can replace or enhance one or more of the circuitries of the aggregate records modeling server 116. In such instances, a fat client device may be useful.

A webpage or another type of graphical user interface can provide the ARM data 309 to a user in a coherent form. A user interface may also be associated or combined with an analytics search tool and fields for viewing analytics and metrics related to sources of online generated revenue. These sources may include advertising campaigns served through various marketing channels, such as marketing channels 324a-324c.

As depicted in FIG. 3, each circuitry of the aggregate records modeling server 116 can provide input and feedback to the other circuitries of the aggregate records modeling server and to other parts of the system. These other parts may include any one or more of the servers or client devices illustrated in FIG. 1 (such as through the network 120). Also, the ARM data 309 may include data corresponding to output of any one of the circuitries of the aggregate records modeling server 116 (such as respective outputs of the circuitries 302-316)

Before deriving ARM data, the aggregate records modeling server 116 in FIG. 3 may receive input through web services data 307 communicated via web services. In other examples, input for the server 116 may be retrieved via other technologies. The web services data 307 can be any data provided by a web service. For example, a web service can provide information pertaining to online marketing channels. In FIG. 3, the marketing channels 324a-324c are depicted, each of which may include sources of ad revenue information received by the aggregate records modeling server 116.

Also, through the network 120, such as by the ad server 108, ad data 303 (such as ad data including ad targeting data) may be communicated to the marketing channels 324a-324c and then via the channels to client-side application circuitry of online audience devices (such as any of the devices 122-128). The client-side application circuitry of the audience devices may use the ad data 303 to deliver ad impressions. The marking channels may use the ad data 303 to direct the ad impressions. For example, at a server of a marketing channel, circuitry of the channel may filter the ad data 303 according to the targeting data. This filtered ad data may then be used to deliver impressions accordingly and ultimately track ad revenue information.

In examples, systems may also track ad targeting through such channels. Also, the marketing channels 324a-324c may exchange information with other information systems, such as other systems providing one or more of content, advertising services, and online searching technologies. These other systems may include cloud computing systems and social media systems (such as an online social networking service). Also, in these examples, tracking of online ad metrics may be incorporated. All of this information and more can be included in the web services data 307 in the form of a collection of facts and a multidimensional data structure, which can be components of an OLAP cube.

Also, FIG. 3 depicts session data 301, such as browser and user session data associated with a web browser session. The session data 301 can include information regarding targeted advertising and user interactions with such advertising. Additionally or alternatively, the session data 301 can be provided by any one or more of the servers illustrated in FIG. 1, such as the analytics server 118, the content server 112, and the ad server 108, such as in the form of data logs. Such data logs and other information described herein may be stored and organize using a collection of facts and a multidimensional data structure, such as through OLAP. User interaction information can be derived from application data such the session data 301. The application data can include or be HTTP session data, data from the application layer of a system under the OSI model or a similar networking or internetworking model, and/or application data from an application not using networking. The application data can include data associated or included in a communication of an email, an online search (such as information pertaining to a submitted search query), and online commercial transactions (such as online purchases). All of this information and more can be included in the web services data 307 in the form of a collection of facts and a multidimensional data structure, which can be components of an OLAP cube, for example.

In an example, the session data 301 may also include corresponding device data, user profile data, raw user interaction data, and application specific session data associated with a client-side application run by client-side application circuitry of an audience device.

Also, the user interactions can be anonymized, sortable, filtered, normalized, or any combination thereof. Anonymity can occur via unique identifications per user so that actual users exist but they are anonymized. The identifications can be randomly generated or arbitrarily generated codes. The aggregate records modeling circuitry 302 can perform these actions on the user interaction information.

Also, in examples, the aggregate records modeling circuitry 302 can transform application data (such as the session data 301) to more efficiently machine-parsable user interaction information. The data can also be received by the aggregate records modeling circuitry 302 in a pre-processed form. For example, the web services data 307 can include XML formatted data. The user interactions can include clicks on online content and ads. The user interactions can also include online conversion events associated with online content and ads, such as associated votes, purchases, subscriptions, posts, or any combination thereof. Such information and much more can be included in the web services data 307 in the form of a collection of facts and a multidimensional data structure, which can be components of an OLAP cube, for example.

In instances using ad targeting information, such information can include a target ad spot (such as a particular ad spot on a particular web property or a mobile application), a target ad spot type (such as banner ad spot, a banner ad spot on a particular type of web property or mobile application, etc.), a target audience group for one or more ads, a certain targeted online audience member, or any combination thereof. Such information can also include a target audience group can be grouped by a demographic (such as sex, gender, age, residence, place of birth, ethnicity, religion, or any combination thereof) and/or a psychographic (such as gender, preferences, behaviors, intents, life stage, lifestyle, or any combination thereof). Preferences can include a preference for certain online content, a preference for a device for browsing online (such as a certain brand or type of device such as a mobile device, desktop computer, etc.), a preference for a web browser, a temporal preference (such as a preference for browsing on a certain day of the week, a certain hour of the day, a certain time of the year, etc.), or any combination thereof. A target online audience member can have a certain user profile. Such a profile can include a combination of demographics, psychographics that define a certain online user. The user profile can be a profile of an actual user and that actual user can have a certain status, such as a status of using the Internet or a certain Internet property or mobile application over a predefined threshold. Such information (whether used for online ad targeting or not) and much more can be included in the web services data 307 in the form of a collection of facts and a multidimensional data structure, which can be components of an OLAP cube, for example.

Other information such as a particular ad spot on a particular web property or a mobile application, ad spot types (such as video ad spots, native ad spots, banner ad spots, ad spots on a particular type of web property or mobile application, etc.), user preferences (such as a user's product preferences), identified user interests, identified user intents, identified online audiences (such as identified by demographic and/or psychographic), identified contextual attributes (such as identified times of day, daily activities, locations, points of interest, etc.), or any combination thereof, may also be include in the web services data 307 in the form of the collection of facts and the multidimensional data structure. Also, these components of the web services data 307 can include respective temporal information occurring in or associated with such information. The respective temporal information can provide a respect links to organized sets of information. These components of the web services data 307 can also include information derived from machine learning. Machine learning can include an algorithm or generation/modification of an algorithm through an automation process of implemented by a machine that can learn from data such as data inputted in to the machine from processes independent of the machine and/or from feedback from processes not independent of the machine. The inputs are used to make predictions or decisions, rather than the machine following only explicitly programmed instructions. Approaches to machine learning can include, decision tree learning, association rule learning, artificial neural networks, inductive logic programming, support vector machines, clustering, Bayesian networks, reinforcement learning, representation learning, similarity and metric learning, sparse dictionary learning, or any known and/or foreseeable combinations thereof. Also, the aforementioned information (whether derived from machine learning or other sources) may include indications of combined attributes combined through various types of associations, such as co-occurrence associations, repetitive patterns of co-occurrences, patterns indicative of iterative refinement (such as in a sequence of online search queries), temporal associations, or any combination thereof.

The aforementioned information may also include filtered information, which can ease data processing tasks of any one of the circuitries of the aggregate records modeling server 116. Filtering processes can be varied, such as by various degrees. The degree of filtering across several attributes may be constant. This can improve modularity of the aforementioned information in that filtering parameters can be adjusted for many attributes using one configuration instead of many separate configurations. Alternatively, filtering variations per attribute may be different and/or independent of other filtering variations for other attributes. In another example, the variations of filtering per attribute may vary but be dependent and/or related to filtering configures of other attributes the aforementioned information. In an example, each iteration of refinement through information filtering can be a part of the web services data. The refined information can include audience and/or online situational information at various levels of granularity.

Such refined information can include a webpage parameter, an ad spot parameter, and/or a user parameter. The page parameter can include subject matter of a page, graphical features of the page, dimensions of the page, viewable portions of the page, visibility rates of the portions or the whole page, rate of impressions on the page, and temporal information regarding any one or more of the aforementioned parameters. The ad spot parameter can include subject matter of an ad spot, dimensions of the spot, viewable portions of the spot, visibility rates of the portions or the whole spot, rate of impressions on the spot, and temporal information regarding any one or more of the aforementioned parameters. The user parameter can include a demographic of the user (e.g., age, sex, residence, and birthplace), a psychographic of the user (e.g., online behavior such as average dwell time, common online queries, and rates of certain queries), a geographic location of the user, and temporal information regarding any one or more of the aforementioned parameters or any combination thereof. All of which can be part of the web services data 307 and organized into a collection of facts and a multidimensional data structure, which can be related to each other through various associations described herein.

The aforementioned information (whether filtered or not) may also include metrics, such as online ad metrics including impression rates, click-through rates, and dwell times, with respect to various parameters described herein. Such information may also include analytics, such as likeness scores with respect to various attributes, such as likeness scores between users, ads, impressions, and webpages. Such scores can be determined through techniques using statistical analysis, such as analysis using Gaussian functions.

Referring back to FIG. 3, the aggregate recording modeling server 116 includes the communications interface circuitry 118 configured to receive the collection of facts and the multidimensional data structure, which can be part of the web services data 307 or can be derived from another source. The communications interface circuitry 118 can be communicatively coupled to the aggregate records modeling circuitry 302. As depicted, the aggregate records modeling circuitry 302 can include the fact identification circuitry 304 and the key generation circuitry 306.

The fact identification circuitry 304 is configured to identify a plurality of records within the collection of facts. Also, the fact identification circuitry 304 is configured to identify a plurality of dimensions of the multidimensional data structure. The fact identification circuitry 304 is also configured to identify respective values for each dimension of the plurality of dimensions per record of the plurality of records. The collection of facts can be organized in a fact table associated with online analytics processing (OLAP). The multidimensional data structure can be an OLAP cube. Each dimension of the multidimensional data structure can be derived from a dimension table associated with the OLAP cube. Also, the fact identification circuitry 304 and other circuitry described herein can interact with, be executed by, or be a part of a processor, such as an OLAP processor.

The key generation circuitry 306 is configured to concatenate respective values for each dimension of the plurality of dimensions per record of the plurality of records resulting in a composite key per record of the plurality of records. The composite key can include a character string including a combination of indications of dimension-value pairs for a record of the plurality of records. The concatenation can also include concatenating a non-alphanumeric character between each of the indications of dimension-value pairs, so that a key of the composite keys includes the non-alphanumeric character as a separator between each dimension-value pair.

The concatenation of the respective values for each dimension per record can include dimensions representative of key fields and excludes dimensions representative of metric fields. A metric field of the plurality of dimensions can hold a metric (e.g., a measured value) or an averaged metric. The key field of the plurality of dimensions can hold a value that at least partially defines a scope of a metric or an averaged metric. A key field of the plurality of dimensions can include a date field, a time field, a product description field, a product region description field, a product type field, or a corresponding field for any of the information described herein that would be appropriate for a key field. A metric field of the plurality of dimensions includes a number of impressions, a number of page views, dwell times, an average of any of the aforementioned metric fields, or a corresponding field for any of the information described herein that would be appropriate for a metric field.

In an example, the key generation circuitry 306 and/or a processor can run a utility function that instructs the concatenation of the respective values for each dimension. The utility function can use an object with dimension and value pairs for a given record to generate the composite key for the given record.

Also, in an example, the key generation circuitry 306 and/or a processor can be configured to roll up a key of the composite keys by replacing at least one dimension-value pair of the key with a placeholder string indicative of all values for the replaced dimension-value pair, resulting in a rolled-up composite key. Also, separate circuitry can be included in the aggregate records modeling server 116 that can be configured to do the same.

Also, as depicted, the server 116 includes key roll-up circuitry 326 configured to roll up the composite keys, which can result in a rolled-up composite key per unique combination of the plurality of dimensions. In an example, the rolling up of a key of the composite keys can include first rollup concatenating respective values for a first set of dimensions of the plurality of dimensions per record of the plurality of records, and second rollup concatenating a specific character string to a result of the first rollup concatenation per record. In such an example, the specific character can act as a placeholder for all values for a second set of dimensions of the plurality of dimensions for all records of the plurality of records. Also, the second rollup concatenation can result in a rolled-up composite key per rolled-up record of the plurality of records. In such an instance, each rolled-up composite key can include a value for each dimension of the first set of dimensions and the specific character string can act as a placeholder for all values for the second set of dimensions. Additionally, the key roll-up circuitry can roll up a key for every one of the composite keys in every possible way, which can result in every possible combination of rolled-up composite keys. In such an example, the cache management circuitry 306 can be configured to cache the composite keys and these rolled-up composite keys in the cache. The cache in such an instance can be a part of a client device and/or the server 116 and the cache can be a block of memory for temporary storage communicatively coupled to a processor operating with the circuitries described herein.

In FIG. 3, the communications interface circuitry 318 and the aggregate records modeling circuitry 302 is communicatively coupled to the cache management circuitry 308. The cache management circuitry 308 is configured to direct caching of the composite keys in a cache. Also, the cache management circuitry 308 can be configured to cache the composite keys and the rolled-up keys in a block of memory for temporary storage. The block of memory can include a part of memory, such as memory of the server 116, wherein the temporariness of the storage of the bock of memory is relative to the remainder of the memory.

In FIG. 3, the communications interface circuitry 318, the aggregate records modeling circuitry 302, and the cache management circuitry 308 is communicatively coupled to the record retrieval circuitry 310. The record retrieval circuitry 310 is configured to retrieve a selected record of the collection of facts using a corresponding composite key of the cached composite keys and rolled-up composite keys as a unique identifier for the selected record. For instance, the selected record corresponds to one of the cached composite keys or cached rolled-up composite keys. In an example, the record retrieval circuitry 310 can be further configured to bypass a request for web services corresponding to the retrieval of the selected record of the collection of facts by reusing a corresponding composite key of the cached composite keys and cached rolled-up composite keys as a unique identifier identifying the selected record. Also, in an example, the record retrieval circuitry 310 can be further configured to determining whether the selected record is cached in the cache by identifying whether a corresponding composite key of the cached composite keys and cached rolled-up composite keys is cached in the cache. In such an example, if the corresponding composite key is not cached in the cache then the processor attempts to retrieve the selected record from the collection of facts using a web service. If the corresponding composite key is cached in the cache then the processor attempts to retrieve the selected record from the collection of facts using the corresponding composite key as a unique identifier of the selected record. Because of these caching and bypassing features, the operations of the aggregate records modeling circuitry 302 do not have to be rerun each time a request for a composite key is made, which saves processing resources, storage resources, and network communication resources of at least the server 116.

In an example, the record retrieval circuitry 310 is further configured to, in retrieving the selected record of the collection of facts, deserialize the composite key using a deserializer such as the deserializer 312. The deserializer 312 can be configured to only recognize a certain set of dimension-value pairs associated with composite keys. For instance, to uniquely identify a single record in a fact API response the record retrieval circuitry 310 may use a composite key that is composed of values from the dimension fields and these values may be concatenated together with the separator "|". For example the record:

```
{
    'rows': [
        {
            'dateTime': '2015-02-03',
            'productDeviceType|desc': 'Mobile'
            'dayAvgPageViews': 6678254,
        },
    ]
}
``` may be retrievable via deserialization of the composite key: '2015-02-03|Mobile'.

In such an example, in requesting a record, the record retrieval circuitry 310 may provide a same key that is assigned in a serializer. A utility function in such an example may generate the key by receiving an object with dimension and value pairs. For example, the utility function may include instructions analogous to:
Model.getID({'dateTime': '2015-02-03', 'productDeviceType|desc': 'Mobile'});
In this last example, the instructions may produce the ID: '2015-02-03|Mobile'.

To retrieve a corresponding record from data storage, the utility function may use instructions analogous to:
var id=Model.getID({'dateTime': '2015-02-03', 'productDeviceType|desc': 'Mobile'});
DataStore.find('model', id);

When requesting a fact from data storage with dropped dimensions (such as in the case of a roll up request), the part of the utility function that generates the ID (such as getId()) can substitute all the missing dimension values with placeholder value (such as '_ALL_') to indicate the dimension is rolled up. In such instances, the serializer may assign the missing dimension values in the record with the placeholder and the assigned ID may also include the placeholder for any missing dimension. For example, with the following dimensions:
'dateTime': Column('string', {type: 'key'}),
'productRegion|desc': Column('string', {type: 'key'}),
'productDeviceType|desc': Column('string', {type: 'key'}),
and when requesting just dateTime and productDeviceType|desc attributes, the utility function may use input analogous to:
var id=Model.getID({'dateTime': '2015-02-03', 'productDeviceType|desc': 'Mobile'});
In this last example, the instructions may produce the ID: '2015-02-03|_ALL_|Mobile'.

When working with a rolled-up record it is often useful to be able to drill down and navigate through details of the rolled-up record. Also, with a rolled-up record it can be useful to group dimensions. For example, a model with the following dimensions:
'dateTime': Column('string', {type: 'key'}),
'productRegion|desc': Column('string', {type: 'key', values: ['Americas Region', 'EMEA Region', 'Asia Pacific Region'}
'productDeviceType|desc': Column('string', {type: 'key', values: ['Desktop', 'Mobile', 'Tablet']}),
may have the following computed properties injected: 'byProductRegion|desc', and 'byProductDeviceType|desc'.

These aforementioned computed properties may take the current ID value and replace the placeholder value with a set of possible dimension values. For example, with a model with the following dimensions:
'dateTime': Column('string', {type: 'key'}),
'productRegion|desc': Column('string', {type: 'key', values: ['Americas Region', 'EMEA Region', 'Asia Pacific Region'}
'productDeviceType|desc': Column('string', {type: 'key', values: ['Desktop', 'Mobile', 'Tablet']}),
when drilling down from a record with the ID '2015-02-03|APAC|_ALL_' (A deviceType rollup),
and when retrieving the computed property by ProductDeviceType|description,
the property will return a promise from a DataStore.findManyIds(model, ids) where ids is an array with the following values: '2015-02-03|APAC|Desktop', '2015-02-03|APAC|Tablet', and '2015-02-03|APAC|Mobile'. The dimension values for 'productDeviceType|desc' can be defined in the model in the array of values. If all dimension values are required to be retrieved then a different model may be needed to be configured and retrieved when calling the drill down property. In the case where a drill down computed property is called with a record where the dimension is already defined (in other words, it has a value other than '_ALL_'), an error will be thrown.

In an example, the record retrieval circuitry can be further configured to receive a selection of a record of the collection of facts via the graphical user interface, prior to the retrieving of the selected record of the collection of facts. In FIG. 3, the communications interface circuitry 318, the aggregate records modeling circuitry 302, the cache management circuitry 308, and the record retrieval circuitry 310 is communicatively coupled to the input/output circuitry 314 of the aggregate records modeling server 116. The input/output circuitry 314 is configured to directly display the retrieved record within a graphical user interface on a display device. The display device can be connected to the server 116 or associated with an administrator client device. The administrator client device can host the GUI via the client-side application 320. Also, as depicted in FIG. 3, the input/output circuitry 314 can include the display circuitry 316. The display circuitry 316 can be configured to display the retrieved record within the graphical user interface on the display device. For example, a retrieved record can be displayed as a chart point, a data table row, or any type of metric displayed across any type of data view.

In an example, the communication's interface circuitry 318 can re-receive the collection of facts and the multidimensional data structure with an additional dimension. Respective parts of the aggregate records modeling circuitry 302 can then re-identify the plurality of records within the collection of facts. Such parts can also re-identify the plurality of dimensions of the multidimensional data structure including identifying the additional dimension and respective values for each dimension of the plurality of dimensions, including the additional dimension, per record of the plurality of records. Other respective parts of the circuitry 302 can then re-concatenate respective values for each dimension of the plurality of dimensions, including the additional dimension, per record of the plurality of records resulting in a composite key per record of the plurality of records that account for the additional dimension. Also, re-performing the rolling up of every one of the composite keys in every possible way can occur. This can result in every possible combination of rolled-up composite keys and these combinations can include the new dimension. The cache management circuitry can also re-direct caching of the composite keys and the rolled-up composite keys in the cache so that the composite keys and the rolled-up keys include the new dimension.

Alternatively or additionally, a non-transitory computer readable medium, such as medium including computer hardware and/or software, can include instructions executable by a processor to identify respective values for each dimension of a plurality of dimensions of a multidimensional data structure per record of a plurality of records within a collection of facts. This medium can also include instructions executable by a processor to concatenate the respective values for each dimension of the plurality of dimensions per record of the plurality of records, resulting in a composite key per record of the plurality of records. This medium can also include instructions executable by a processor to roll up the composite keys, resulting in a rolled-up composite key per unique combination of the plurality of dimensions. This medium can also include instructions executable by a processor to cache the composite keys and the rolled-up keys in a block of memory for temporary storage, wherein temporariness of the storage of the bock of memory is relative to the remainder of the memory. This medium can also include instructions executable by a processor to retrieve a selected record of the collection of facts using a corresponding composite key of the cached composite keys and rolled-up composite keys as a unique identifier for the selected record, wherein the selected record corresponds to one of the cached composite keys or cached rolled-up composite keys.

Figure 4:
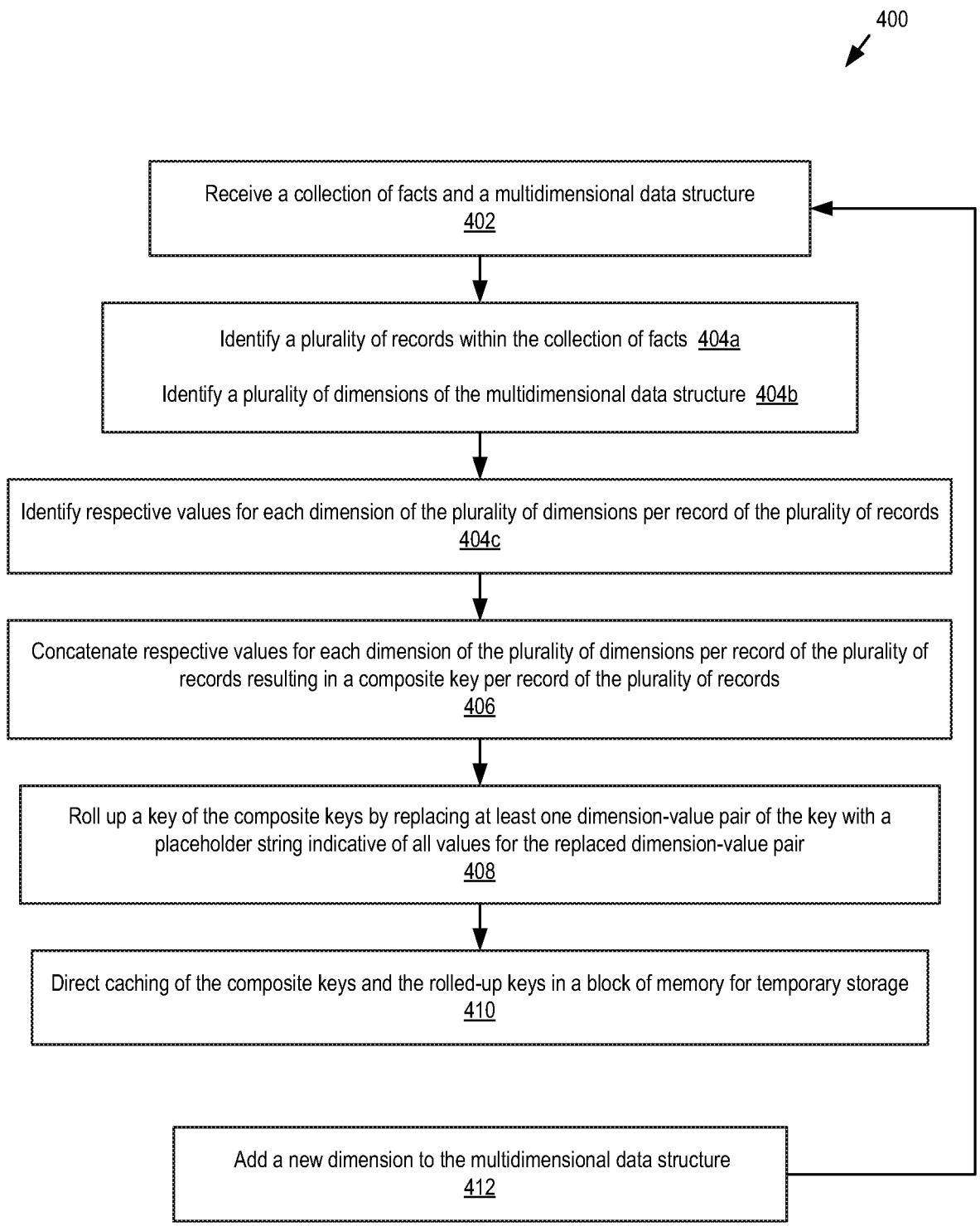
FIGS. 4 and 5 illustrate example operations performed by a system, such as the systems in FIGS. 1 and 3.

FIG. 4 illustrates example operations 400 performed by a system, such as one of the systems illustrated in FIGS. 1 and 3. The example operations 400 provide techniques for aggregate records modeling. For example, a system such as the system of the aggregate records modeling server 116 can include circuitry (such as the interface circuitry 318) that can receive a collection of facts and a multidimensional data structure at 402. Also, the information can be received by a processor of a server or fat client device. Such a processor can be part of the server 116 in FIG. 1, for example. Also, all the operations associated with FIG. 3 can ultimately occur at and/or be performed by a processor, such as a central processing unit (CPU). The operations can continue at 404a, with identifying, such as by the processor, a plurality of records within the collection of facts. At 404b, the operations continue with identifying, such as by the processor, a plurality of dimensions of the multidimensional data structure. At 404c, the operations continue with identifying, such as by the processor, respective values for each dimension of the plurality of dimensions per record of the plurality of records. At 406, the operations continue with concatenating, such as by the processor, respective values for each dimension of the plurality of dimensions per record of the plurality of records resulting in a composite key per record of the plurality of records. At 408, the operations continue with rolling up, such as by the processor, a key of the composite keys by replacing at least one dimension-value pair of the key with a placeholder string indicative of all values for the replaced dimension-value pair, resulting in a rolled-up composite key. This can be redone for each composite key, at 408. At 410, the operations continue with directing caching, such as by the processor, the composite keys and the rolled-up keys in a block of memory for temporary storage (such as cache memory). Also, each time a new dimension is added to the multidimensional data structure, such as at 412, the operations 400 are repeated with respect to the addition of the new dimension.

Figure 5:
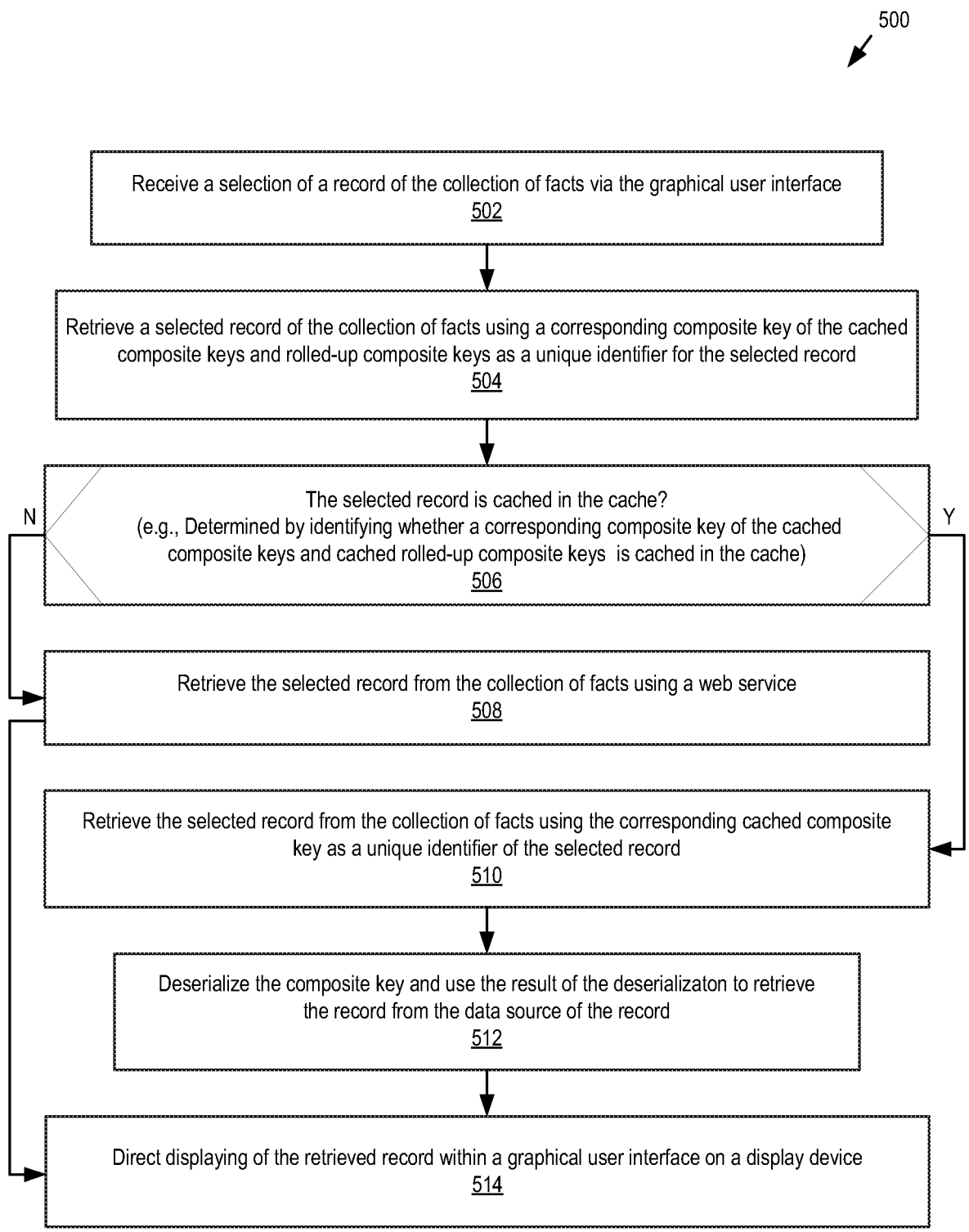

FIG. 5 illustrates example operations 500 performed by a system, such as one of the systems illustrated in FIGS. 1 and 3. The example operations 500 provide techniques for retrieving records associated with the aggregate records modeling techniques described herein. For example, a system such as the system of the aggregate records modeling server 116 can include circuitry (such as the record retrieval circuitry 310) that can receive a selection of a record of the collection of facts via the graphical user interface at 502. Also, such a selection can be received by a processor of a server or fat client device. Such a processor can be part of the server 116 in FIG. 1, for example. The operations can continue at 504 with retrieving, such as by the processor, a selected record of the collection of facts using a corresponding composite key of the cached composite keys and rolled-up composite keys as a unique identifier for the selected record. In such an instance, the selected record corresponds to one of the cached composite keys or cached rolled-up composite keys. At 506, the operations can continue with determining, such as by the processor, whether the selected record is cached in the cache by identifying whether a corresponding composite key of the cached composite keys and cached rolled-up composite keys is cached in the cache. If the corresponding composite key is not cached in the cache, then the operations can continue with retrieving, such as by the processor, the selected record from the collection of facts using a web service at 508. If the corresponding composite key is cached in the cache, then the operations can continue with retrieving, such as by the processor, the selected record from the collection of facts using the cached corresponding composite key as a unique identifier of the selected record at 510. At 512, in retrieving the selected record from a data storage device (such as the aggregate records modeling database 117), the operations can continue with deserializing, such as by the processor, the composite key and using the result of the deserialization to retrieve the record from the data source of the record. The deserialization in this instance only recognizes a certain set of dimension-value pairs associated with composite keys, and consistency in using the certain set of dimension-value pairs is maintained by the operations 400 of FIG. 4, for example. At 514, the operations can continue with directing, such as by the processor, displaying of the retrieved record within a graphical user interface on a display device, so that a user submitting the selection is provided the selected record.

Figure 6:
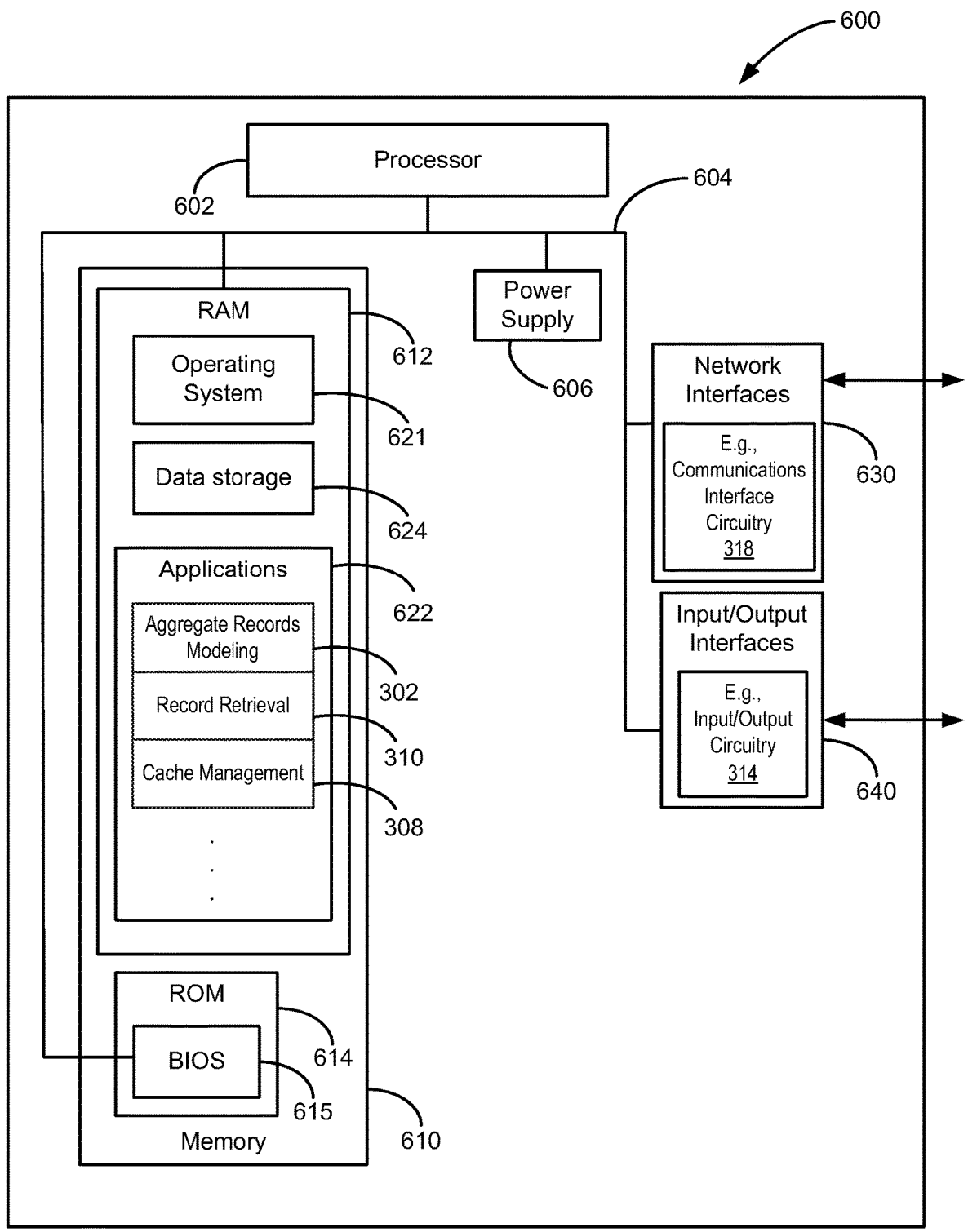
FIG. 6 illustrates a block diagram of an example device of a system that can provide aggregate records modeling, such as a server or a fat client device of the systems in FIGS. 1 and 3.

FIG. 6 is block diagram of example electronic device 600 that can implement aspects of and related to example systems that can provide aggregate records modeling. Device 600 can illustrate a server device (such as the aggregate records modelling server 116) or even a client device (such as any one of the client devices 122-128 illustrated in FIG. 1 or a client device that hosts the client-side application circuitry 320 illustrated in FIG. 3). In the instance that the device 600 illustrates a client device that client device should be a fat client device that can provide robust caching capabilities to cache the composite keys and rolled-up composite keys and can include at least some circuitries similar to the aggregate records modeling circuitry 302, the fact identification circuitry 304, the key generation circuitry 306, the cache management circuitry 308, the record retrieval circuitry 310, and the deserializer 312.

The electronic device 600 can include a processor 602, memory 610, a power supply 606, and input/output components, such as network interfaces 630 and input/output interfaces 640, and a communication bus 604 that connects the aforementioned elements of the electronic device. The network interfaces 630 can include a receiver and a transmitter (or a transceiver), and an antenna for wireless communications. The processor 602 can be any type of data processing device, such as a central processing unit (CPU). Also, for example, the processor 602 can include central processing logic. The central processing logic may include hardware (such as circuitry and/or microprocessors), firmware, software and/or combinations of each to perform functions or actions, and/or to cause a function or action from another component. Also, the central processing logic may include a software controlled microprocessor, discrete logic such as an application specific integrated circuit (ASIC), a programmable/programmed logic device, memory device containing instructions, or the like, or combinational logic embodied in hardware. Also, the processing logic may also be fully embodied as software. Each one of the circuitries of FIG. 3 may include at least part of the processor 602.

The memory 610, which can include random access memory (RAM) 612 or read-only memory (ROM) 614, can be enabled by memory devices, such as a primary (directly accessible by the CPU) and/or a secondary (indirectly accessible by the CPU) storage device (such as flash memory, magnetic disk, optical disk). The memory 610 may include a non-transitory computer readable medium executable by the processor. The memory 610 may include instructions for each one of circuitries of FIG. 3. Also, each one of the circuitries of FIG. 3 may include at least part of the memory 610.

The memory 610, which can include random access memory (RAM) 612 or read-only memory (ROM) 614, can be enabled by memory devices. The RAM 612 can store data and instructions defining an operating system 621, data storage 624, and applications 622, such as applications implemented through hardware including the aggregate records modeling circuitry 302, the fact identification circuitry 304, the key generation circuitry 306, the cache management circuitry 308, the record retrieval circuitry 310, and the deserializer 312. The applications 622 may include hardware (such as circuitry and/or microprocessors), firmware, software, or any combination thereof. The ROM 614 can include basic input/output system (BIOS) 615 of the electronic device 600.

The power supply 606 contains power components, and facilitates supply and management of power to the electronic device 600. The input/output components can include at least part of the communications interface circuitry 318 for facilitating communication between components of the electronic device 600, components of external devices (such as components of other devices of the information system 100), and end users. For example, such components can include a network card that is an integration of a receiver, a transmitter, and I/O interfaces, such as input/output interfaces 640, which can include input/output circuitry 314. The I/O components, such as I/O interfaces 640, can include user interfaces such as displays, keyboards, touchscreens, microphones, and speakers. Further, some of the I/O components, such as I/O interfaces 640, and the bus 604 can facilitate communication between components of the electronic device 600, and can ease processing performed by the Processor 602.

The electronic device 600 can send and receive signals, such as via a wired or wireless network, or may be capable of processing or storing signals, such as in memory as physical memory states, and may, therefore, operate as a server and/or a fat client device. The device 600 can include a single server, dedicated rack-mounted servers, desktop computers, laptop computers, tablet computers, smart phones, set top boxes, integrated devices combining various features, such as two or more features of the foregoing devices, or the like.

The invention claimed is:

1. A server having at least a processor executing program codes stored in a memory, wherein the program codes configure the server to perform operations, comprising:
   receiving over a network by communication interface circuitry, a collection of facts and a multidimensional data structure;
   identifying a plurality of records within the collection of facts;
   identifying a plurality of dimensions of the multidimensional data structure;
   identifying respective values for each dimension of the plurality of dimensions per each separate record of the plurality of records;
   generating a composite key by concatenating respective values for each dimension of the plurality of dimensions, wherein the composite key comprises a character string comprising a combination of (i) a first indication of a first dimension-value pair corresponding to a first dimension and (ii) a second indication of a second dimension-value pair corresponding to a second dimension;
generating a rolled-up composite key, using the composite key, by replacing at least one dimension-value pair of the composite key with a placeholder string indicative of all values for the at least one dimension-value pair;
caching the composite key and the rolled-up composite key in a cache memory; and
using at least one of the composite key or the rolled-up composite key as a unique identifier to retrieve, from the cache memory, a selected record of the collection of facts on selected contents or items in order to adjust online ad content parameters for distribution to a client device.

2. The server of claim 1, the operations comprising:
organizing the collection of facts in a fact table associated with online analytics processing (OLAP).

3. The server of claim 1, the operations comprising:
displaying the selected record within a graphical user interface on a display device.

4. The server of claim 1, the operations comprising:
deriving each dimension of the multidimensional data structure from a dimension table associated with an online analytics processing (OLAP) cube.

5. The server of claim 1, the operations comprising:
determining, based upon at least one key field of the plurality of dimensions, at least one of a date field, a time field, a product description field, a product region description field or a product type field.

6. The server of claim 1, the operations comprising:
determining, based upon at least one metric field of the plurality of dimensions, at least one of a number of impressions, a number of times content has been delivered, a number of times content has been shown, a number of page views, dwell time or time spent on viewing delivered content.

7. The server of claim 1, the operations comprising:
deriving at least some of at least one of the collection of facts or the multidimensional data structure from machine learning.

8. A method, comprising:
receiving over a network by communication interface circuitry, a collection of facts and a multidimensional data structure;
identifying a plurality of records within the collection of facts;
identifying a plurality of dimensions of the multidimensional data structure;
identifying respective values for each dimension of the plurality of dimensions per each separate record of the plurality of records;
generating a composite key by concatenating respective values for each dimension of the plurality of dimensions, wherein the composite key comprises a character string comprising a combination of (i) a first indication of a first dimension-value pair corresponding to a first dimension and (ii) a second indication of a second dimension-value pair corresponding to a second dimension;
generating a rolled-up composite key, using the composite key, by replacing at least one dimension-value pair of the composite key with a placeholder string indicative of all values for the at least one dimension-value pair;
caching the composite key and the rolled-up composite key in a cache memory; and
using at least one of the composite key or the rolled-up composite key as a unique identifier to retrieve, from the cache memory, a selected record of the collection of facts on selected contents or items in order to adjust online ad content parameters for distribution to a client device.

9. The method of claim 8, comprising:
organizing the collection of facts in a fact table associated with online analytics processing (OLAP).

10. The method of claim 8, comprising:
displaying the selected record within a graphical user interface on a display device.

11. The method of claim 8, comprising:
deriving each dimension of the multidimensional data structure from a dimension table associated with an online analytics processing (OLAP) cube.

12. The method of claim 8, comprising:
determining, based upon at least one key field of the plurality of dimensions, at least one of a date field, a time field, a product description field, a product region description field or a product type field.

13. The method of claim 8, comprising:
determining, based upon at least one metric field of the plurality of dimensions, at least one of a number of impressions, a number of times content has been delivered, a number of times content has been shown, a number of page views, dwell time or time spent on viewing delivered content.

14. The method of claim 8, comprising:
deserializing the composite key using a deserializer.

15. A non-transitory computer readable medium comprising instructions that when executed by a processor perform operations comprising:
receiving over a network by communication interface circuitry, a collection of facts and a multidimensional data structure;
identifying a plurality of records within the collection of facts;
identifying a plurality of dimensions of the multidimensional data structure;
identifying respective values for each dimension of the plurality of dimensions per each separate record of the plurality of records;
generating a composite key by concatenating respective values for each dimension of the plurality of dimensions, wherein the composite key comprises a character string comprising a combination of (i) a first indication of a first dimension-value pair corresponding to a first dimension and (ii) a second indication of a second dimension-value pair corresponding to a second dimension;
generating a rolled-up composite key, using the composite key, by replacing at least one dimension-value pair of the composite key with a placeholder string indicative of all values for the at least one dimension-value pair;
caching the composite key and the rolled-up composite key in a cache memory; and
using at least one of the composite key or the rolled-up composite key as a unique identifier to retrieve, from the cache memory, a selected record of the collection of facts on selected contents or items in order to adjust online ad content parameters for distribution to a client device.

16. The non-transitory computer readable medium of claim 15, the operations comprising:

organizing the collection of facts in a fact table associated with online analytics processing (OLAP).

17. The non-transitory computer readable medium of claim 15, the operations comprising:
displaying the selected record within a graphical user interface on a display device.

18. The non-transitory computer readable medium of claim 15, the operations comprising:
deriving each dimension of the multidimensional data structure from a dimension table associated with an online analytics processing (OLAP) cube.

19. The non-transitory computer readable medium of claim 15, the operations comprising:
determining, based upon at least one key field of the plurality of dimensions, at least one of a date field, a time field, a product description field, a product region description field or a product type field.

20. The non-transitory computer readable medium of claim 15, the operations comprising:
determining, based upon at least one metric field of the plurality of dimensions, at least one of a number of impressions, a number of times content has been delivered, a number of times content has been shown, a number of page views, dwell time or time spent on viewing delivered content.

* * * * *